R. M. WILBUR.
ANIMAL TRAP.
APPLICATION FILED JAN. 18, 1909.
942,528.
Patented Dec. 7, 1909.
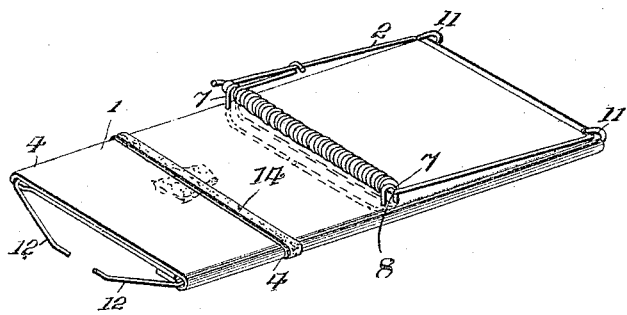
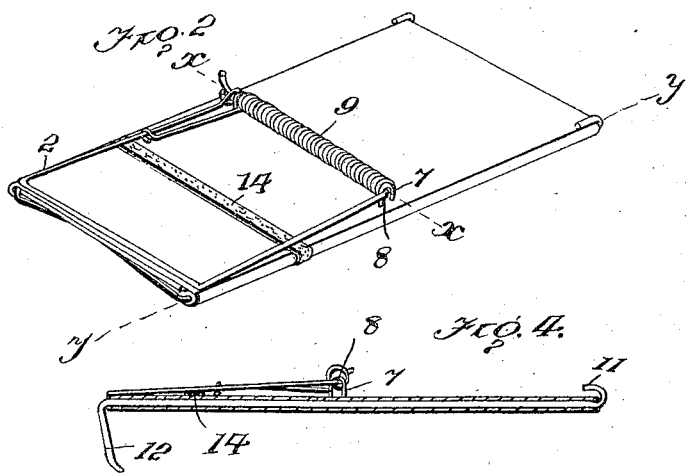
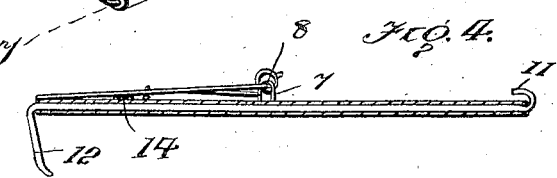
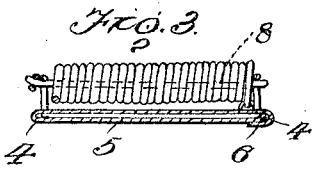
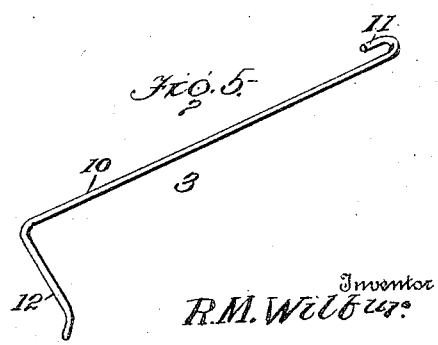
Inventor
R. M. Wilbur

UNITED STATES PATENT OFFICE.

REUBEN M. WILBUR, OF LEADVILLE, COLORADO.

ANIMAL-TRAP.

942,528.

Specification of Letters Patent.   Patented Dec. 7, 1909.

Application filed January 18, 1909.   Serial No. 472,946.

*To all whom it may concern:*

Be it known that I, REUBEN M. WILBUR, citizen of the United States, residing at Leadville, in the county of Lake and State of Colorado, have invented certain new and useful Improvements in Animal-Traps, of which the following is a specification.

The purpose of this invention is to supply a trap which may be cheaply constructed and which, in operation, is effective and sensitive so as to be sprung by the weight of the animal stepping upon the base or platform.

With this and other objects in view that will more fully appear as the description proceeds, the invention consists in certain constructions and arrangements of the parts that I shall hereinafter fully describe, and then point out the novel features thereof in the appended claims.

For a full understanding of the invention and the merits thereof, and to acquire a knowledge of the details of construction, reference is to be had to the following description and accompanying drawing, in which:

Figure 1 is a perspective view of a trap embodying the invention, showing the fly or jaw set; Fig. 2 is a perspective view showing the fly or jaw sprung; Fig. 3 is a transverse section of the trap on the line $x$—$x$ of Fig. 2; Fig. 4 is a longitudinal section on the line $y$—$y$ of Fig. 2; and, Fig. 5 is a perspective view of the trigger.

Corresponding and like parts are referred to in the following description and indicated in all the views of the drawing by the same reference characters.

In its formation, the trap comprises a platform or base 1, a fly or jaw 2 and a trigger 3.

The platform may be of any formation and is preferably constructed of sheet metal having end portions folded so as to provide longitudinal bearings 4 at the edges of the platform. An edge portion 5 extends the full width of the platform and is confined at its free edge by the opposite edge portion 6, the latter being comparatively narrow and serving as securing means for the part 5 and to provide a longitudinal bearing for a trigger. Loops 7 project from the base or platform intermediate of the ends thereof and receive the pivot wire 8 of the jaw or fly. The loops 7 are formed by bending end portions of a folded wire about at right angles, said wire being confined between the upper and lower portions of the platform, as indicated most clearly in Fig. 3.

The fly or jaw 2 is of rectangular formation and is constructed of a single wire in the form substantially as shown, an end portion of the wire forming the axis about which the fly or jaw turns and being received in the loops 7. A coil spring 9 is mounted upon the wire 8, and one end engages the platform and the opposite end engages the side member of the fly or jaw so as to close the same upon the platform or base, as indicated in Fig. 2. The spring 9 is at all times under tension.

The trigger is provided in duplicate and consists of a shaft 10, a catch 11 and a pedal 12. The trigger is formed of a single length of wire, the end portions of which are bent about as indicated, to form the parts 11 and 12. The shaft 10 is mounted in a longitudinal bearing 4 and is about equal in length to the length of the platform or base. Longitudinal movement of the trigger is prevented by the bent end portions thereof forming the parts 11 and 12 which engage opposite ends of the bearing 4. The catch 11 is of hook form and is adapted to extend over an end portion of the platform to engage with the jaw or fly, as indicated in Fig. 1. The pedal 12 extends beneath the platform and is adapted to lie close against the same when the trap is sprung, as indicated in Fig. 2, but when the trap is set, the trigger 12 inclines to the horizontal, as indicated in Fig. 1. By providing two triggers, the trap is held level and the jaw or fly is relieved of torsional strain and is held close to the platform when the trap is set, as indicated in Fig. 1.

Fig. 2 illustrates the normal position of the parts. When the trap is set, as indicated in Fig. 1, the fly or jaw is turned back upon the platform against the tension of the spring 9 and is engaged by the catches 11 of the two triggers. The trap, when set, is placed upon the floor or other supporting surface and is held elevated at one end by the pedals 12. Any suitable bait is placed upon the platform to entice the animal. By reason of the inclination of the pedals 12, any slight pressure upon the platform moves the pedals and rocks the triggers, thereby disengaging the catches 11 from the fly or jaw, which latter moves quickly by the action of the spring 9 and confines the animal between the platform and jaw in the manner well known.

To prevent displacement of the bait 13 securing means are employed and coöperate with the platform, the same consisting of an elastic band 14, which may be slipped upon the platform and may be readily replaced at any time. The provision of the elastic band enables the position of the bait to be changed at will.

Having thus described the invention, what I claim is:

1. In combination, a platform formed of a strip of material bent upon itself to form superposed plates, the longitudinal edge of one of which overlaps the longitudinal edge of the other, a spring-actuated jaw mounted upon the platform, longitudinal shafts journaled between said plates at opposite edges of the platform, catches at one end of the shafts to engage with the jaw and hold the same when the trap is set, and pedals at the opposite ends of the shafts to extend beneath the platform and support the same at one end.

2. In a trap of the character described, the combination of a platform having opposite edge portions bent to provide bearings, a spring-actuated jaw mounted upon the platform, and triggers mounted in said longitudinal bearings, each trigger comprising a shaft, a catch at one end of the shaft and a pedal at the opposite end of said shaft.

3. In a trap of the character described, the combination of a platform having a longitudinal edge thereof bent to provide a bearing, a spring actuated jaw mounted upon the platform, a trigger journaled in said longitudinal bearing and comprising a shaft having a catch at one end thereof, and a pedal at its opposite end, the pedal being bent at an angle to the longitudinal plane of the shaft and having its free end inclined downwardly beneath the platform and terminating approximately at the middle longitudinal line of said platform.

In testimony whereof I affix my signature in presence of two witnesses.

REUBEN M. WILBUR. [L. S.]

Witnesses:
GORMAN H. CUDWELL,
FRANK H. DONOVAN.